United States Patent [19]
Carter et al.

[11] Patent Number: 6,028,690
[45] Date of Patent: Feb. 22, 2000

[54] REDUCED MICROMIRROR MIRROR GAPS FOR IMPROVED CONTRAST RATIO

[75] Inventors: Duane E. Carter, Plano; James D. Huffman, Richardson; Rodney D. Miller, Frisco; Brian L. Ray, Richardson; Robert E. Meier, Dallas, all of Tex.

[73] Assignee: Texas Instruments Incorporated, Dallas, Tex.

[21] Appl. No.: 09/197,723

[22] Filed: Nov. 23, 1998

Related U.S. Application Data

[60] Provisional application No. 60/066,579, Nov. 26, 1997.

[51] Int. Cl.$^7$ ............................................. G02B 26/08
[52] U.S. Cl. .................................. 359/224; 359/292
[58] Field of Search .......................... 359/224, 225, 359/290, 291, 295

[56] References Cited

U.S. PATENT DOCUMENTS

| | | | |
|---|---|---|---|
| 4,786,149 | 11/1988 | Hoenig et al. | 359/290 |
| 5,061,049 | 10/1991 | Hornbeck | 359/224 |
| 5,583,688 | 12/1996 | Hornbeck | 359/291 |
| 5,636,052 | 6/1997 | Arney et al. | 359/291 |
| 5,661,591 | 8/1997 | Lin et al. | 359/290 |
| 5,734,492 | 3/1998 | Chung | 359/291 |
| 5,735,026 | 4/1998 | Min | 359/291 |
| 5,739,946 | 4/1998 | Iwanaga et al. | 359/290 |
| 5,754,330 | 5/1998 | Nam | 359/291 |
| 5,760,947 | 6/1998 | Kim et al. | 359/291 |
| 5,790,297 | 8/1998 | Berlin | 359/291 |
| 5,815,305 | 9/1998 | Min et al. | 359/292 |
| 5,943,157 | 8/1999 | Florence et al. | 359/290 |

*Primary Examiner*—Georgia Epps
*Assistant Examiner*—Evelyn A. Lester
*Attorney, Agent, or Firm*—Charles A. Brill; Frederick J. Telecky, Jr.; Richard L. Donaldson

[57] ABSTRACT

A micromirror array fabricated on a semiconductor substrate 708. The micromirrors in the micromirror array logically divided into an interior active region 704 which selectively modulates light striking the mirrors in the interior active region 704, and an exterior border region 702 for producing a dark border around the image produced by the interior active region 704. A gap between each mirror allows adjacent mirrors to rotate. The gap 712 between mirrors in the interior active region 704 of the array is larger than the gap 710 between at least some of the mirrors in the exterior border region 702. The smaller gap 710 in the exterior region 702 is enabled by restricting mirrors in the exterior region 702 to a single direction of rotation.

15 Claims, 5 Drawing Sheets

FIG. 10

REDUCED MICROMIRROR MIRROR GAPS FOR IMPROVED CONTRAST RATIO

CROSS-REFERENCE TO RELATED APPLICATIONS

This application claims priority under 35 USC § 119(e)(1) of provisional application No. 60/066,579 filed Nov. 26, 1997.

The following patents and/or commonly assigned patent applications are hereby incorporated herein by reference:

| U.S. Pat. No. | Filing Date | Issue Date | Title |
| --- | --- | --- | --- |
| 5,061,049 | Sept. 13, 1990 | Oct. 29, 1991 | Spatial Light Modulator and Method |
| 5,583,688 | Dec. 21, 1993 | Dec. 10, 1996 | Multi-Level Digital Micromirror Device |

FIELD OF THE INVENTION

This invention relates to the field of image display systems, particularly to spatial light modulator based display systems, and more particularly to digital micromirror device based display systems.

BACKGROUND OF THE INVENTION

Micromechanical devices are small structures typically fabricated on a semiconductor wafer using techniques such as optical lithography, doping, metal sputtering, oxide deposition, and plasma etching which have been developed for the fabrication of integrated circuits.

Digital micromirror devices (DMDs), sometimes referred to as deformable micromirror devices, are a type of micromechanical device. Other types of micromechanical devices include accelerometers, pressure and flow sensors, gears and motors. While some micromechanical devices, such as pressure sensors, flow sensors, and DMDs have found commercial success, other types have not yet been commercially viable.

Digital micromirror devices are primarily used in optical display systems. In display systems, the DMD is a light modulator which uses digital image data to modulate a beam of light by selectively reflecting portions of the beam of light to a display screen. While analog modes of operation are possible, DMDs are typically operated in a digital bistable mode of operation and as such are the core of the first true digital full-color image projection systems.

Micromirrors have evolved rapidly over the past ten to fifteen years. Early devices used a deformable reflective membrane which, when electrostatically attracted to an underlying address electrode, dimpled toward the address electrode. Schlieren optics were used to illuminate the membrane and create an image from the light scattered by the dimpled portions of the membrane. Schlieren systems enabled the membrane devices to form images, but the images formed were very dim and had low contrast ratios, making them unsuitable for most image display applications.

Later micromirror devices used flaps or diving board-shaped cantilever beams of silicon or aluminum, coupled with dark-field optics to create images having improved contrast ratios. Flap and cantilever beam devices typically used a single metal layer to form the top reflective layer of the device. This single metal layer tended to deform over a large region, however, which scattered light impinging on the deformed portion. Torsion beam devices use a thin metal layer to form a torsion beam, which is referred to as a hinge, and a thicker metal layer to form a rigid member, or beam, typically having a mirror-like surface: concentrating the deformation on a relatively small portion of the DMD surface. The rigid mirror remains flat while the hinges deform minimizing the amount of light scattered by the device and improving the contrast ratio of the device.

Recent micromirror configurations, called hidden-hinge designs, further improve the image contrast ratio by fabricating the mirror on a pedestal above the torsion beams. The elevated mirror covers the torsion beams, torsion beam supports, and a rigid yoke connecting the torsion beam and mirror support, further improving the contrast ratio of images produced by the device.

In addition to contrast ratio, image brightness is another image characteristic that has a large impact on consumer satisfaction. Given a selection of displays to chose from, consumers tend to prefer the brightest display in the selection. In an effort to meet the demands of consumers, display manufacturers continually have increased the brightness of displays. Unfortunately, increasing display brightness tends to affect other image characteristics such as the contrast ratio. Increasing the brightness also tends to lighten the border region surrounding the display, often due to light scattered by the display. Although the border region is not part of the image being displayed, image quality is largely a matter of perception and consumers often find the lighter border region to be annoying. Therefore, there is a need for a display method and system providing an increased contrast ratio and image brightness, while decreasing the amount of light provided to the display border regions.

SUMMARY OF THE INVENTION

Objects and advantages will be obvious, and will in part appear hereinafter and will be accomplished by the present invention which provides a method and system for a micromirror device capable of producing an image having increased brightness and contrast in the image region and decreased brightness in a non-image border region adjacent to the image region. One embodiment of the claimed invention provides a micromirror array with a substrate having electrical components fabricated on a first surface, an array of micromechanical light modulator elements, each comprising an addressing circuit and a mirror supported by and spaced apart from the substrate, and each of said mirrors separated from adjacent mirrors by a gap. The array is logically divided into inner light modulating region and an outer border region surrounding the inner light modulating region, and the gap between adjacent mirrors is smaller between at least some mirrors in the outer border region than between mirrors in the inner light modulating region. According to some embodiments of the claimed invention, gaps between the mirrors in the outer border region are too small to allow adjacent mirrors to rotate towards each other without interference.

According to another embodiment of the claimed invention, a method of forming a micromechanical light modulator array is provided. The method comprises forming landing electrode/mirror bias structures and address electrodes on a semiconductor substrate, depositing a first spacer layer on the semiconductor substrate, patterning the first spacer layer to define hinge support spacervia locations, depositing a metal hinge layer over the first spacer layer, forming at least one hinge etch mask on the metal hinge layer, depositing a metal yoke layer on the metal hinge layer and the hinge etch masks, patterning the metal hinge layer and the metal yoke layer to form at least one hinge and at least one hinge yoke attached to the hinge, depositing a second spacer layer over the metal yoke layer, patterning the second spacer layer to define mirror support spacervia locations, depositing a metal mirror layer over the second spacer layer, patterning the metal mirror layer to define an array of micromirrors, the array of micromirrors forming an interior active region and an exterior border region, each micromirror separated from adjacent micromirrors by a mirror gap, wherein the mirror gap between micromirrors in the interior active region is larger than the mirror gap between at least some of the micromirrors in the exterior border region, and removing the first and second spacer layers.

According to yet another embodiment of the claimed invention, a display system is provided. The display system comprising a light source for producing a light beam along a light path and a micromirror device in the light path for selectively reflecting portions of the light beam along a second light path toward an image plane. The micromirror device comprises a substrate having electrical components fabricated on a first surface of the substrate and an array of micromechanical light modulator elements, each comprising an addressing circuit and a mirror supported by and spaced apart from the substrate, each of the mirrors separated from adjacent mirrors by a gap, the array forming an inner light modulating region and an outer border region surrounding the inner light modulating region. The mirror gap is smaller between mirrors in the outer border region than between mirrors in the inner light modulating region.

BRIEF DESCRIPTION OF THE DRAWINGS

For a more complete understanding of the present invention, and the advantages thereof reference is now made to the following descriptions taken in conjunction with the accompanying drawings, in which.

DETAILED DESCRIPTION OF THE PREFERRED EMBODIMENTS

A new micromirror architecture has been developed that simultaneously increases image brightness and contrast ratio, while decreasing the amount of light reaching the image border region. This new architecture therefore increases the quality of the image projected and provides the crisp, sharp, transition from the image region to the border region that consumers prefer. This new architecture provides these commercial advantages with no additional processing steps, no additional cost of materials, and no projected impact on device yields. These improvements are provided by a departure from the uniform arrays of the prior art, coupled with reduced mirror gaps in the portion of the array used to form an image and further reduced mirror gaps in the border region of the array.

Figure 1:
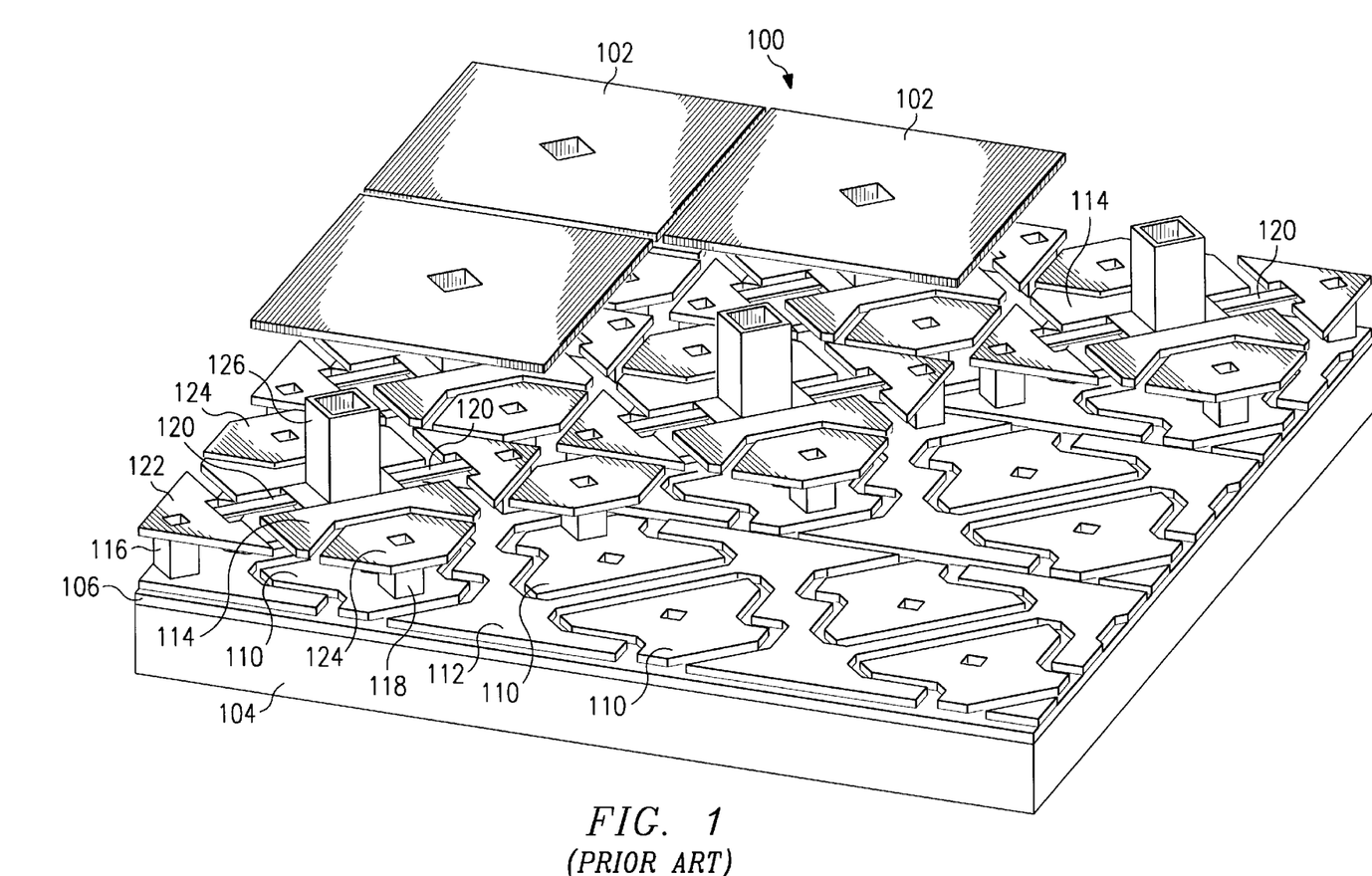
FIG. 1 is a perspective view of a portion of a micromirror array of the prior art.
Figure 2:
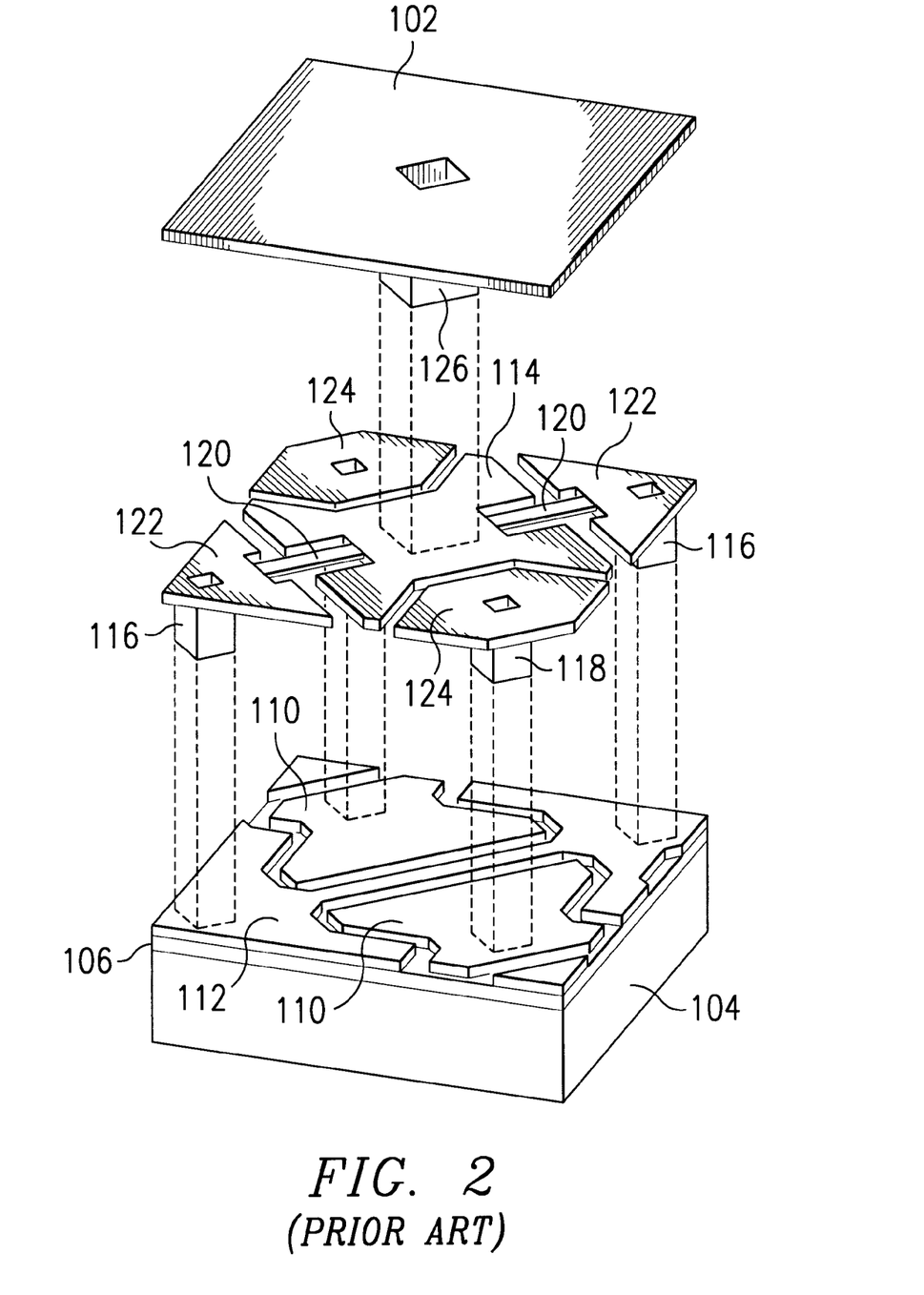
FIG. 2 is an exploded perspective view of a single micromirror element from the array of FIG. 1.

A typical hidden-hinge DMD 100 is actually an orthogonal array of DMD cells, or elements. This array often includes more than a thousand DMD rows and columns of DMDs. FIG. 1 shows a small portion of a DMD array with several mirrors 102 removed to show the underlying mechanical structure of the DMD array. FIG. 2 is an exploded view of a single DMD element further detailing the relationships between the DMD structures.

A DMD is fabricated on a semiconductor, typically silicon, substrate 104. Electrical control circuitry is typically fabricated in or on the surface of the semiconductor substrate 104 using standard integrated circuit process flows. This circuitry typically includes, but is not limited to, a memory cell associated with and typically underlying each mirror 102 and digital logic circuits to control the transfer of the digital image data to the underlying memory cells. Voltage driver circuits to drive bias and reset signals to the mirror superstructure may also be fabricated on the DMD substrate, or may be external to the DMD. Image processing and formatting logic is also formed in the substrate 104 of some designs.

Some DMD configurations use a split reset configuration which allows several DMD elements to share one memory cell—thus reducing the number of memory cells necessary to operate a very large array, and making more room available for voltage driver and image processing circuitry on the DMD integrate circuit. For the purposes of this disclosure, addressing circuitry is considered to include any circuitry, including direct voltage connections and shared memory cells, used to control the direction of rotation of a mirror. Split reset is enabled by the bistable operation of a DMD, which allows the contents of the underlying memory to change without affecting the position of the mirror 102 when the mirror has a bias voltage applied.

The silicon substrate 104 and any necessary metal interconnection layers are isolated from the DMD superstructure by an insulating layer 106 which is typically a deposited silicon dioxide layer on which the DMD superstructure is formed. Holes or vias 108 are opened in the oxide layer to allow electrical connection of the DMD superstructure with the electronic circuitry formed in the substrate 104.

The first layer of the superstructure is a metalization layer, typically the third metalization layer, often called M3. Two metalization layers are typically required to interconnect the circuitry fabricated on the substrate. This metalization layer is deposited on the insulating layer and patterned to form address electrodes 110 and a mirror bias connection 112. Some micromirror designs have landing electrodes which are separate and distinct structures electrically connected to the mirror bias connection 112. Landing electrodes limit the rotation of the mirror 102 and prevent the rotated mirror 102 or hinge yoke 114 from touching the address electrodes 110, which have a voltage potential relative to the mirror 102. If the mirror 102 contacts the address electrodes 110, the resulting short circuit could fuse the torsion hinges 116 or weld the mirror 102 to the address electrodes 110, in either case ruining the DMD. Since the same voltage is always applied-to both the landing electrodes and the mirrors 102, the mirror bias connection and the landing electrodes are preferably combined in a single structure when possible. The mirror bias connection 112 typically includes regions called landing sites which mechanically limit the rotation of the mirror 102 or a hinge yoke 114. These landing sites are often coated with a material chosen to reduce the tendency of the mirror 102 and torsion hinge yoke 144 to stick to the landing site.

Mirror bias/reset voltages travel to each mirror 102 through a combination paths using both the mirror bias/reset metalization 112 and mirrors and torsion beams of adjacent mirror elements. Split reset designs require the array of mirrors to be subdivided into multiple subarrays each having an independent mirror bias connection. The landing electrode/mirror bias 112 configuration shown in FIG. 1 is ideally suited to split reset applications since the DMD elements are easily segregated into electrically isolated rows or columns simply by isolating the mirror bias/reset layer between the subarrays.

A first layer of supports, typically called spacervias, is fabricated on the metal layer forming the address electrodes 110 and mirror bias connections 112. These spacervias, which include both hinge support spacervias 116 and upper address electrode spacervias 118, are typically formed by spinning a thin spacer layer over the address electrodes 110 and mirror bias connections 112. This thin spacer layer is typically a 1 μm thick layer of positive photoresist. After the photoresist layer is deposited, it is exposed, patterned, and cured by deep UV hardening to form holes where the spacervias will be formed. This spacer layer, as well as a thicker spacer layer used later in the fabrication process, are often called sacrificial layers since they are used only as forms during the fabrication process and are removed from the device prior to device operation.

A thin layer of metal, is sputtered onto the spacer layer and into the holes. An oxide is then formed over the thin metal layer and patterned to form an etch mask over the regions that later will form hinges 120. A thicker layer of metal typically an aluminum alloy, is sputtered over the thin layer and oxide etch masks. Another layer of oxide is formed and patterned to define the hinge yoke 114, hinge cap 122, and the upper address electrodes 124. After this second oxide layer is patterned, the two metals layers are etched simultaneously and the oxide etch masks removed to leave thick rigid hinge yokes 114, hinge caps 122, and upper address electrodes 124, and thin flexible torsion beams 120.

A thick spacer layer is then deposited over the thick metal layer and patterned to define holes in which mirror support spacervias 126 will be formed. The thick spacer layer is typically a 2 μm thick layer of positive photoresist. A layer of mirror metal, typically an aluminum alloy, is sputtered on the surface of the thick spacer layer and into the holes in the thick spacer layer. This metal layer is then patterned to form the mirrors 102 and both spacer layers are removed using a plasma etch.

Once the two spacer layers have been removed, the mirror is free to rotate about the axis formed by the torsion hinge. Electrostatic attraction between an address electrode 110 and a deflectable rigid member, which in effect form the two plates of an air gap capacitor, is used to rotate the mirror structure. Depending on the design of the micromirror device, the rigid member is the torsion beam yoke 114, beam, mirror 102, both the yoke 114 and beam or mirror 102, or a beam attached directly to the torsion beams. The upper address electrodes 124 also electrostatically attract the rigid member.

The force created by the voltage potential is a function of the reciprocal of the distance between the two plates. As the rigid member rotates due to the electrostatic torque, the torsion beam hinges resist with a restoring torque which is an approximately linear function of the angular deflection of the torsion beams. The structure rotates until the restoring torsion beam torque equals the electrostatic torque.

Micromirror devices are generally operated in one of two modes of operation. The first mode of operation is an analog mode, sometimes called beam steering, wherein the address electrode is charged to a voltage corresponding to the desired deflection of the mirror. Light striking the micromirror device is reflected by the mirror at an angle determined by the deflection of the mirror. Depending on the voltage applied to the address electrode, the cone of light reflected by an individual mirror is directed to fall outside the aperture of a projection lens, partially within the aperture, or completely within the aperture of the lens. The reflected light is focused by the lens onto an image plane, with each individual mirror corresponding to a location on the image plane. As the cone of reflected light is moved from completely within the aperture to completely outside the aperture, the image location corresponding to the mirror dims, creating continuous brightness levels.

The second mode of operation is a digital mode. When operated digitally, each micromirror is fully deflected in either of the two directions about the torsion beam axis. Digital operation uses a relatively large voltage to ensure the mirror is fully deflected Since it is advantageous to drive the address electrode using standard logic voltage levels, a bias voltage, typically a negative voltage, is applied to the mirror metal layer to increase the voltage difference between the address electrodes and the mirrors. Use of a sufficiently large mirror bias voltage, a voltage above what is termed the collapse voltage of the device, ensures the mirror will deflect to the closest landing electrodes even in the absence of an address voltage. Therefore, by using a large mirror bias voltage, the address voltages need only be large enough to deflect the mirror slightly.

To create an image using the micromirror device, the light source is positioned at an angle equal to twice the angle of rotation so that mirrors rotated toward the light source reflect light in a direction normal to the surface of the micromirror device and into the aperture of a projection lens—creating a bright pixel on the image plane. Mirrors rotated away from the light source reflect light away from the projection lens—leaving the corresponding pixel dark. Intermediate brightness levels are created by pulse width modulation techniques in which the mirror is rapidly rotated on and off timewise to vary the quantity of light reaching the image plane. The human eye integrates the light pulses and the brain perceives an intermediate brightness level that is flicker-free.

Full-color images are generated by using three micromirror devices to produce three single-color images, or by sequentially forming three single-color images using a single micromirror device illuminated by a beam of light passing through three color filters mounted on a rotating color wheel.

Increasing the brightness of a micromirror-based display system requires either increasing the power of the illumination source, typically and arc-lamp, increasing the efficiency of the projection optics, or increasing the efficiency of the micromirror device. The efficiency of the micromirror is a function of both the efficiency of the mirror surface and the proportion of the illuminated surface of the micromirror device that is operable to selectively reflect light to the image.

Figure 3:
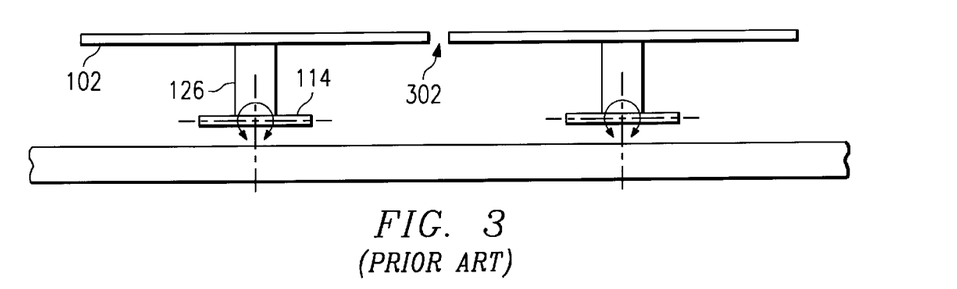
FIG. 3 is a side view of two micromirror elements from FIG. 1.

The major loss of active area in micromirror devices is due to the gaps formed between mirror elements. One such gap 302 is shown in FIG. 3, which shows a side view of two micromirror elements viewed along the hinge axis. In FIG. 3, only the hinge yokes 114, mirror spacervias 126, and mirrors 102 are shown. The hinges 120, hinge caps 122, hinge supports 116, address electrodes 110, upper address electrodes 124, upper address support spacervias 118, and landing electrode/mirror bias components 112 are not shown. The mirror gap 302 is necessary to allow the first and second spacer layers to be removed during a plasma etch step.

In operation, light striking the micromirror device between mirrors 102 passes through the mirror gap 302 and strikes the substrate and metal layers on the substrate. Light striking the substrate and metal layers beneath the mirrors is detrimental to the operation of the micromirror device in three ways. First, the light passing through the mirror gaps 302 of mirror elements which are turned on is light that preferably would have been reflected toward the image plane. By not reflecting this light to the image plane, the image brightness reduced.

Second, light passing between the mirrors is typically reflected by the metalization layers on the substrate, the hinge yokes 114, hinges 120, hinge caps 122, hinge supports 116, address electrodes 110, upper address electrodes 124, upper address support spacervias 118, mirror spacervias 126, landing electrode/mirror bias components 112, and mirror 102 edge. After being scattered by all of these metal components some of the light passes back through the mirror gaps and is projected onto the image plane. The scattered light projected onto the image plane reduces the contrast ratio of the display resulting in a washed out image and also partially illuminates the border region around the image.

The third effect of light passing through the mirror gap 302 is the possible generation of photocarriers in the semiconductor device substrate. While most of the photons passing through the mirror gap 302 are blocked by the various metalization layers used to interconnect the circuitry on the substrate and build the mirror superstructures, any photons that do strike the semiconductor substrate generate photocarriers which, in large enough quantities, can disturb the charge applied to the address electrodes and result in a mirror 102 rotating toward the wrong address electrode.

One method of improving both the contrast ratio and the overall image brightness is to reduce the mirror gaps 302. Prior micromirror devices, both torsion beam and hidden hinge designs, have used 16 $\mu$m mirrors on 17 $\mu$m centers, leaving a 1 $\mu$m gap through which to etch away any temporary spacer layers used to form the device. Fabricating devices with 16.2 $\mu$m mirrors, still on 17 $\mu$m centers, leaving only a 0.8 $\mu$m gap, increases the active area of the micromirror device. The increase in active area and decrease in mirror gaps 302 increases both the image brightness and the contrast ratio of the display system.

Figure 4:
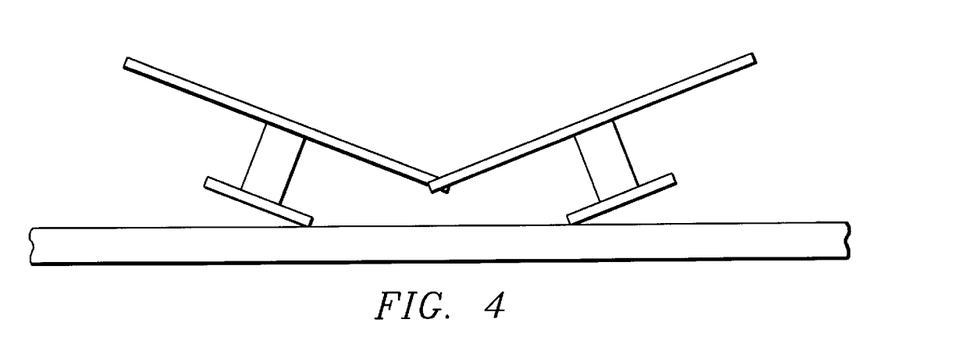
FIG. 4 is a side view of two micromirror elements showing the interference that occurs when the elements are too close and rotate towards each other.

The minimum mirror gap 302 is determined not only by lithography and etch process constraints, but primarily by the need to avoid interference between adjacent mirrors. Modern hidden hinge micromirror designs rotate about a hinge axis which is vertically displaced from the mirror by a mirror support spacervia Since the hinge axis does not pass through the mirror, the mirror is laterally displaced as it rotates about the hinge axis. If adjacent mirror elements are not adequately spaced apart, the adjacent mirrors will collide when they rotate toward each other. This trait limits the size of present hidden hinge micromirror designs to 16.2 $\mu$m for mirrors on 17 $\mu$m centers. FIG. 4 shows the position of two adjacent mirrors that are not adequately spaced apart, resulting in an overlap when both mirrors are rotated toward each other.

Both the increase in image brightness and the increase in contrast ratio improve the viewer's perception of image quality not only by improving the image itself, but also by increasing brightness of the image compared to the region immediately surrounding the image. As mentioned above, projection television consumers prefer a very dark border region around the projected image.

Figure 5:
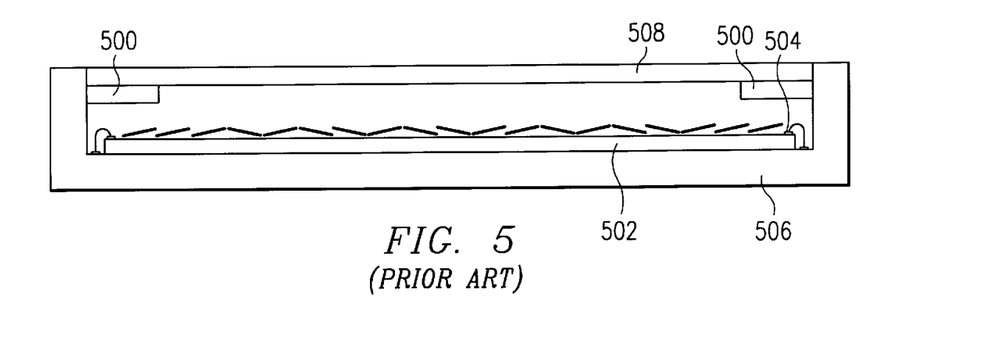
FIG. 5 is a side view of a micromirror device in a package with a window and aperture.

Two measures are taken to form a very dark border region around the image display region of a micromirror image projection system. First, as shown in FIG. 5, a metal aperture 500 is used to mask the portions of the micromirror device that do not contain active mirrors. For example, the edge of a micromirror device 502 typically contains bond pads 504 which are wired, using standard semiconductor packaging techniques, to bond pads on a ceramic package 506. The aperture 500 is typically attached to a glass window 508 which allows light to reach the micromirror device 502 while protecting the micromirror device 502 in the ceramic package 506.

Figure 6:
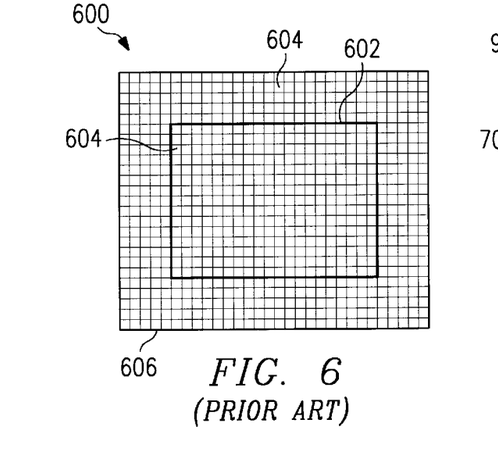
FIG. 6 is a top view of a small micromirror array defining an interior active region and an exterior border region.

Second, extra rows and columns of micromirrors surrounding the image region of the micromirror are added. FIG. 6 is a top view of a very small micromirror array 600 showing an interior image region 602 of micromirrors 604, surrounded by an exterior border region 606 of micromirrors 602. Commercially useful micromirror arrays are much larger than the array 600 of FIG. 6, often having well over 1,000 rows and columns in the interior image region 602 alone, and 50 additional rows and columns along each side of the exterior border region 606.

The border region 606 provides two advantages over systems using only an aperture to frame the image and shield the edges of the micromirror device. First, the border mirrors which are rotated off produce a darker region than the flat metal aperture. Second, the border region provides alignment tolerance between the active interior region 602 and the aperture.

In operation, the mirrors 604 in the border region 606 are always rotated to the off position so that light striking the mirrors 604 in the border region 606 is reflected away from the image being produced by the active interior region 602. Knowing the mirrors 604 in the exterior border region 606 will never be rotated on allows the micromirror device designer to make two changes to the device. First, since these mirror elements are never rotated to the on position, they only require one address electrode under each of the mirrors. Furthermore, the single address electrode can be hardwired to the proper bias voltage, eliminating the need for a memory cell to drive the address electrode. Eliminating part of the drive circuitry frees up additional space in the substrate and on the surface of the substrate for fabricating and routing circuitry to drive the mirrors in the interior active region of the array.

Figure 7:
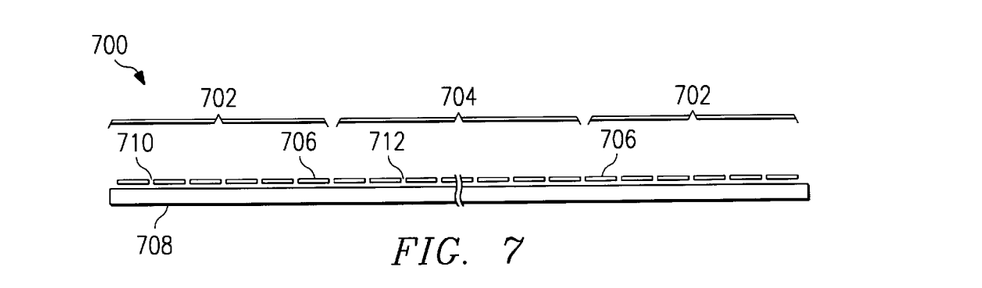
FIG. 7 is a side view of a micromirror array according to one embodiment of the present invention showing reduced mirror gaps in the border region.

More importantly, limiting the rotation of the border mirrors enables the use of smaller gaps in the exterior border region than are possible in the interior active region. FIG. 7 shows a side view of part of a micromirror array 700 divided into three regions, two exterior border regions 702, and an interior active region 704. The gaps between mirrors in the exterior border regions 702 are smaller than the gaps between mirrors in the interior active region 704. The exterior border region contains mirrors that are slightly larger, typically 16.4 μm, but with the same center-to-center spacing, typically 17 μm, than the mirrors in the interior active region. Alternatively, the exterior border region 704 contains mirrors that are identical to the mirrors in the interior active region 704 but with a smaller center-to-center dimension. Using larger mirrors with the same center-to-center dimension is preferable to decreasing the center-to-center dimension since it reduces the total surface consumed by the mirror gaps and results in the same number of rows and columns in both the interior and exterior regions of the array.

Figure 8:
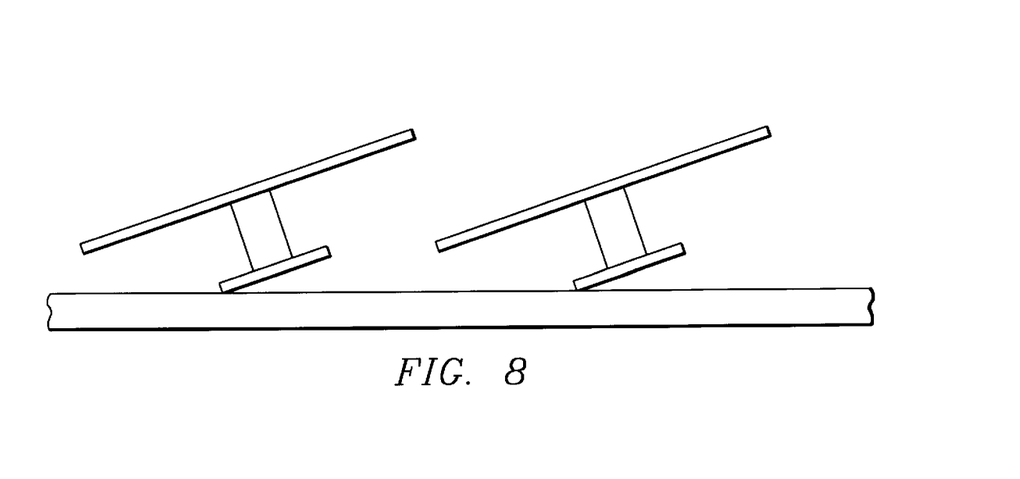
FIG. 8 is a side view of two closely spaced micromirror elements showing a lack of interference when the micromirrors are rotated in the same direction.

FIG. 8 shows two micromirrors, with increased mirror size, which are both rotated in the same direction. Comparison of FIGS. 4 and 8 illustrates how the mirror on the left tilts away from the mirror on the right when both mirrors rotate counter-clockwise in FIG. 8, while the mirror on the left tilts into the path of the mirror on the right when the two mirrors rotate toward each other in FIG. 4.

Although devices according to the present invention have smaller gaps in the exterior border region 704, interference between the mirrors in the border regions 702, which are always turned off, and the mirrors in the interior active region 704, which turn both on and off, occurs when the mirror gap between the two regions is too small. According to the embodiment discussed above, which uses 16.4 μm mirrors in the exterior border region 702, and 16.2 μm mirrors in the interior active region 704, both on 17 μm centers, there is a 0.7 μm gap between the mirrors in the exterior border region 702 and the interior active region 704—and interference does not occur.

Other mirror sizes result in interference between the exterior border region 702 and the interior active region 704 which must be eliminated. According to one embodiment, a single row or column of smaller mirrors 706 in the exterior border region 702, typically the same size as the mirrors in the interior active region 704, is used to ensure clearance between the border mirrors and the mirrors in the interior active region 704. Alternatively, the distance between mirrors in the interior active region 704 and the exterior border region 702 is increased. Another alternative is to make at least some of the mirrors on the interior side of the exterior border region asymmetrical about the mirror support spacervia. Although asymmetrical mirrors are typically avoided since they move differently in each direction, asymmetrical mirrors are acceptable in the exterior border region since the mirrors in the border region only rotate one direction.

Figure 9:
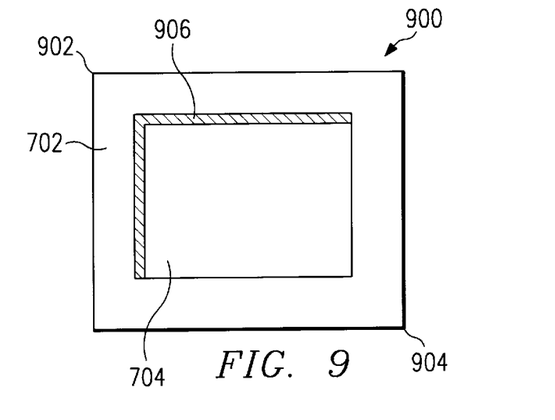
FIG. 9 is a top view of a small micromirror array defining an interior active region, an exterior border region, and a intermediate buffer portion of the exterior border region.

FIG. 9 is a top view of a micromirror array 900 according to another embodiment of the disclosed invention In FIG. 9, an interior active region 704 of mirrors is surrounded by an exterior border region 702. The micromirror array 900 is orientated so that mirrors rotate to the on position toward corner 902, and to the off position toward corner 904. Mirrors along the upper and left sides of the interior active region 704 have the potential of interfering with the adjacent larger mirrors in the buffer region 906 of the exterior border region 702 of the array 900. To prevent interference, the mirrors, or mirror spacing, of the mirror elements in the buffer region 906 are modified as discussed above for region 706 in FIG. 7.

Figure 10:
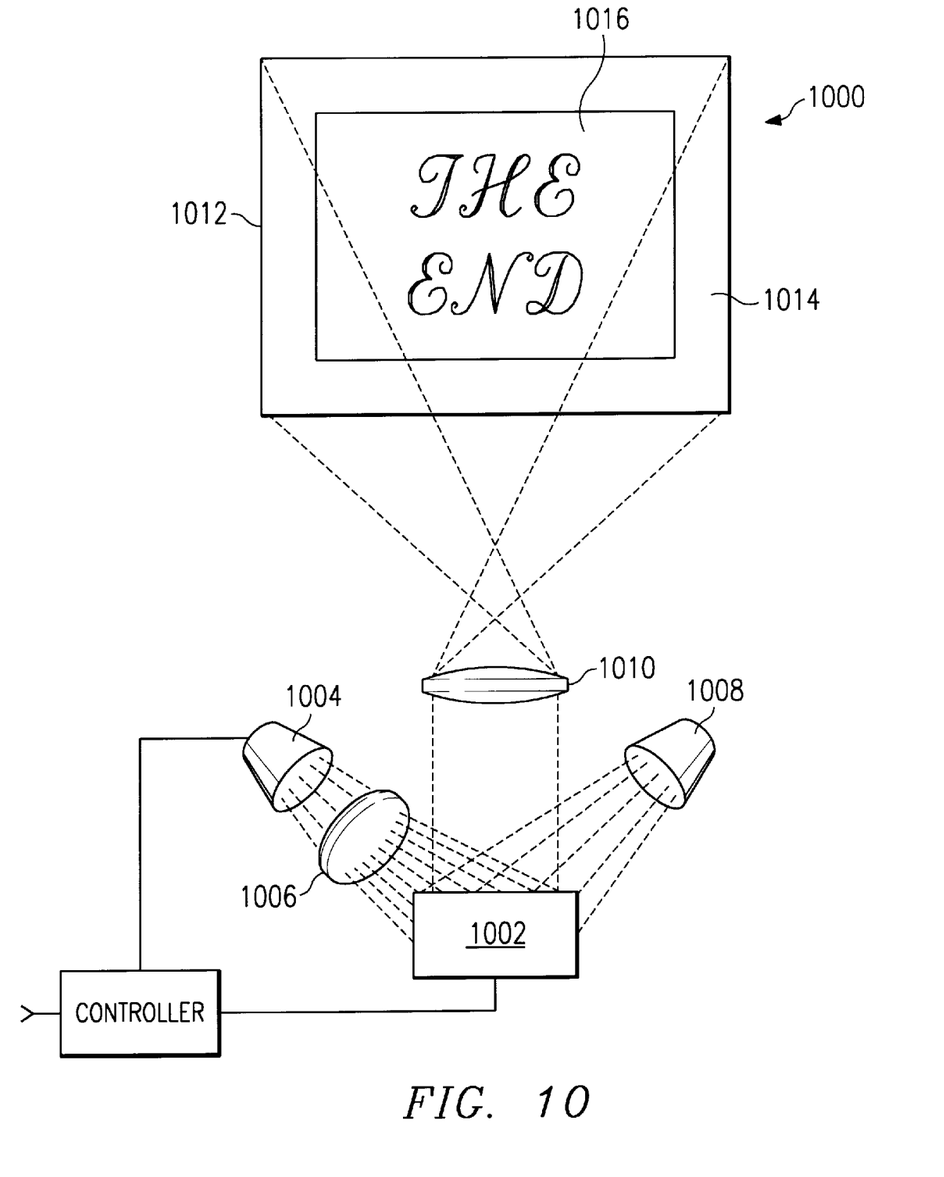
FIG. 10 is a schematic view of a micromirror-based projection display system according to one embodiment of the present invention.

FIG. 10 is a schematic view of an image projection system 1000 using an improved micromirror device 1002 according to the present invention. In FIG. 10, light from light source 1004 is focused on the improved micromirror device 1002 by lens 1006. Although shown as a single lens, lens 1006 is typically a group of lenses and mirrors which together focus and direct light from the light source 1004 onto the surface of the micromirror device 1002. Mirrors on the micromirror device that are rotated to an off position reflect light to a light trap 1008 while mirrors rotated to an on position reflect light to projection lens 1010, which is shown as a single lens for simplicity. Projection lens 1010 focuses the light modulated by the micromirror device 1002 onto an image plane or screen 1012. Mirrors in the exterior border region of micromirror device 1002 direct the light impinging on the border region to the light trap 1008, ensuring that the border region of the display 1014 is very dark and creating a sharp contrast with the interior image portion 1016 of the image plane.

Thus, although there has been disclosed to this point a particular embodiment for a micromirror having improved image brightness and contrast ratio and improved border darkness, and method therefore etc., it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A micromirror array comprising:
   a substrate having electrical components fabricated on a first surface of said substrate; and
   an array of micromechanical light modulator elements, each micromechanical light modulator element comprising an addressing circuit and a mirror supported by and spaced apart from said substrate, each of said mirrors separated from adjacent mirrors by a gap, said array forming an inner light modulating region and an outer border region surrounding said inner light modulating region;
   wherein said gap is smaller between at least some mirrors in said outer border region than between mirrors in said inner light modulating region.

2. The micromirror array of claim 1, said mirrors operable to rotate about an axis parallel to said substrate surface, said mirrors in said inner light modulating region operable to rotate in two directions about said axis, said mirrors in said outer border region operable to rotate only in one direction about said axis.

3. The micromirror array of claim 1, wherein said gap between at least two adjacent mirrors in said outer border region is too small to permit said at least two adjacent mirrors to rotate independently without interference.

4. The micromirror array of claim 1, said outer border region comprising a buffer region adjacent a portion of said inner light modulating region, said buffer region comprising mirrors spacer apart by gaps as large as the gaps between mirrors in said inner light modulating region.

5. The micromirror array of claim 1, wherein said mirrors are spaced closer together in said outer border region.

6. The micromirror array of claim 1, wherein said mirrors in said outer border region are larger than said mirrors in said inner light modulating region.

7. The micromirror array of claim 1, said mirrors in said outer border region being larger than said mirrors in said inner light modulating region while said distance between said micromechanical light modulator elements in said outer border region and said micromechanical modulator elements in said inner light modulating region is equal.

8. The micromirror array of claim 1, further comprising:
two address electrodes for each modulator element in said inner light modulating region, said two address electrodes on said substrate surface, one said address electrode on each side of said axis to enable said mirror element to rotate in either direction about said axis.

9. The micromirror array of claim 1, further comprising:
one address electrode for each modulator element in said outer border region, said address electrode on said substrate surface on one side of said axis to enable said mirror element to rotate toward said address electrode about said axis.

10. A method of forming a micromechanical light modulator array, said method comprising:
forming landing electrode/mirror bias structures and address electrodes on a semiconductor substrate;
depositing a first spacer layer on said semiconductor substrate;
patterning said first spacer layer to define hinge support spacervia locations;
depositing a metal hinge layer over said first spacer layer;
forming at least one hinge etch mask on said metal hinge layer;
depositing a metal yoke layer on said metal hinge layer and said hinge etch masks;
patterning said metal hinge layer and said metal yoke layer to form at least one hinge and at least one hinge yoke attached to said hinge;
depositing a second spacer layer over said metal yoke layer;
patterning said second spacer layer to define mirror support spacervia locations;
depositing a metal mirror layer over said second spacer layer;
patterning said metal mirror layer to define an array of micromirrors, said array of micromirrors forming an interior active region and an exterior border region, each said micromirror separated from adjacent micromirrors by a mirror gap, wherein said mirror gap between micromirrors in said interior active region is larger than said mirror gap between at least some of the micromirrors in said exterior border region; and
removing said first and said second spacer layers.

11. The method of claim 10, said step of patterning said metal mirror layer step further comprising: forming a small mirror gap between at least two adjacent micromirrors in said exterior border region, said small mirror gap being too small to allow said at least two adjacent micromirrors independently to rotate about an axis formed by said at least one hinge.

12. A display system comprising:
a light source for producing a light beam along a light path; and
a micromirror device in said light path for selectively reflecting portions of said light beam along a second light path toward an image plane, said micromirror device comprising:
a substrate having electrical components fabricated on a first surface of said substrate; and
an array of micromechanical light modulator elements, each micromechanical light modulator element comprising an addressing circuit and a mirror supported by and spaced apart from said substrate, each of said mirrors separated from adjacent mirrors by a gap, said array forming an inner light modulating region and an outer border region surrounding said inner light modulating region;
wherein said gap is smaller between mirrors in said outer border region than between mirrors in said inner light modulating region.

13. The display system of claim 12 further comprising:
a projection lens in said second light path form receiving said selectively reflected light and focusing said selectively reflected light on said image plane.

14. The display system of claim 12 further comprising:
a controller for providing image data to said micromirror device.

15. The display system of claim 12 further comprising:
a source lens for focusing light from said light source onto said micromirror device.

* * * * *